United States Patent
Norota

(10) Patent No.: US 11,501,063 B2
(45) Date of Patent: Nov. 15, 2022

(54) INFORMATION PROCESSING APPARATUS, RECORDING MEDIUM, AND INFORMATION PROCESSING SYSTEM

(71) Applicant: Ken Norota, Kanagawa (JP)

(72) Inventor: Ken Norota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/450,184

(22) Filed: Oct. 7, 2021

(65) Prior Publication Data
US 2022/0121811 A1 Apr. 21, 2022

(30) Foreign Application Priority Data
Oct. 20, 2020 (JP) .............................. JP2020-176094

(51) Int. Cl.
| | | |
|---|---|---|
| *G06F 40/186* | (2020.01) | |
| *G06F 3/0482* | (2013.01) | |
| *G06F 21/45* | (2013.01) | |
| *G06F 16/93* | (2019.01) | |

(52) U.S. Cl.
CPC .......... *G06F 40/186* (2020.01); *G06F 3/0482* (2013.01); *G06F 16/93* (2019.01); *G06F 21/45* (2013.01); *G06F 2221/2141* (2013.01)

(58) Field of Classification Search
CPC .................................................... G06F 40/186
USPC ........................................................ 715/243
See application file for complete search history.

(56) References Cited

U.S. PATENT DOCUMENTS

| | | | | |
|---|---|---|---|---|
| 7,287,229 | B2 * | 10/2007 | Forkner ................ | G06F 16/957 |
| | | | | 707/E17.119 |
| 7,558,828 | B1 * | 7/2009 | Panzer .................. | H04L 67/535 |
| | | | | 709/205 |
| 10,503,825 | B2 * | 12/2019 | Otaki ..................... | G06F 40/186 |
| 2005/0262439 | A1 * | 11/2005 | Cameron .............. | G06F 16/116 |
| | | | | 715/239 |
| 2007/0244897 | A1 * | 10/2007 | Voskuil ................ | G06F 16/2308 |
| | | | | 707/999.009 |
| 2009/0183092 | A1 * | 7/2009 | Naghshineh ............ | G06F 9/451 |
| | | | | 707/999.102 |

(Continued)

FOREIGN PATENT DOCUMENTS

| | | |
|---|---|---|
| JP | 2007-026123 | 2/2007 |
| JP | 4800760 | 10/2011 |
| JP | 2019-144903 | 8/2019 |

*Primary Examiner* — Reza Nabi
(74) *Attorney, Agent, or Firm* — IPUSA, PLLC

(57) ABSTRACT

An information processing apparatus includes a memory, and a processor coupled to the memory and configured to store a template in the memory in response to the template being created; receive an input of first input information in a case where the created template is used in performing a request task; and receive an input of second input information in a case where the created template is used in performing a report task. In the template, first identification information for identifying the request task is associated with a first input item, and second identification information for identifying the report task is associated with a second input item. The first input item is selected such that first input information corresponding to the first input item is to be input, and the second input item is selected such that second input information corresponding to the second input item is to be input.

9 Claims, 17 Drawing Sheets

(56) References Cited

U.S. PATENT DOCUMENTS

| | | | |
|---|---|---|---|
| 2011/0004522 A1* | 1/2011 | Lee | G06Q 30/0276 |
| | | | 715/776 |
| 2015/0356312 A1* | 12/2015 | Sato | G06Q 10/109 |
| | | | 726/28 |
| 2020/0201937 A1* | 6/2020 | Frid-Nielsen | G06F 40/14 |
| 2021/0165957 A1* | 6/2021 | Yamada | G06F 40/186 |
| 2021/0256863 A1* | 8/2021 | Ando | G06K 7/1434 |
| 2021/0304144 A1* | 9/2021 | Watanabe | G06Q 10/103 |
| 2021/0390295 A1* | 12/2021 | Murata | G06V 30/412 |
| 2022/0121811 A1* | 4/2022 | Norota | G06F 3/0482 |
| 2022/0138160 A1* | 5/2022 | Anjum | G06Q 10/103 |
| | | | 715/272 |
| 2022/0138161 A1* | 5/2022 | Anjum | G06Q 50/188 |
| | | | 715/272 |
| 2022/0138690 A1* | 5/2022 | Anjum | G06Q 50/188 |
| | | | 705/80 |
| 2022/0180267 A1* | 6/2022 | Nakagawa | G06Q 10/06311 |

\* cited by examiner

FIG.4A

| TEMPLATE ID | TEMPLATE ADMINISTRATIVE PERMISSION | DOCUMENT POSTING PERMISSION | DOCUMENT VIEWING PERMISSION | DOCUMENT EDITING PERMISSION | TEMPLATE |
|---|---|---|---|---|---|
| 1 | TPL GROUP A<br>TPL GROUP B | ADMINISTRATIVE GROUP X | LOCATION GROUP A | ADMINISTRATIVE GROUP X | SAFETY AND HEALTH INSPECTION |
| 2 | TPL GROUP C<br>TPL GROUP D | ADMINISTRATIVE GROUP Y | DEPARTMENT GROUP A | ADMINISTRATIVE GROUP X | CHECK BEFORE RELEASE |
| . . . | . . . | . . . | . . . | . . . | . . . |

| GROUP ID | GROUP NAME | REGISTERED USER |
|---|---|---|
| 1 | TPL GROUP A | xx@xx.yy.zz<br>aa@bb.cc.dd |
| 2 | ADMINISTRATIVE GROUP X | qq@xx.yy.zz<br>ll@bb.cc.dd<br>zz@bb.cc.dd |
| . . . | . . . | . . . |

230

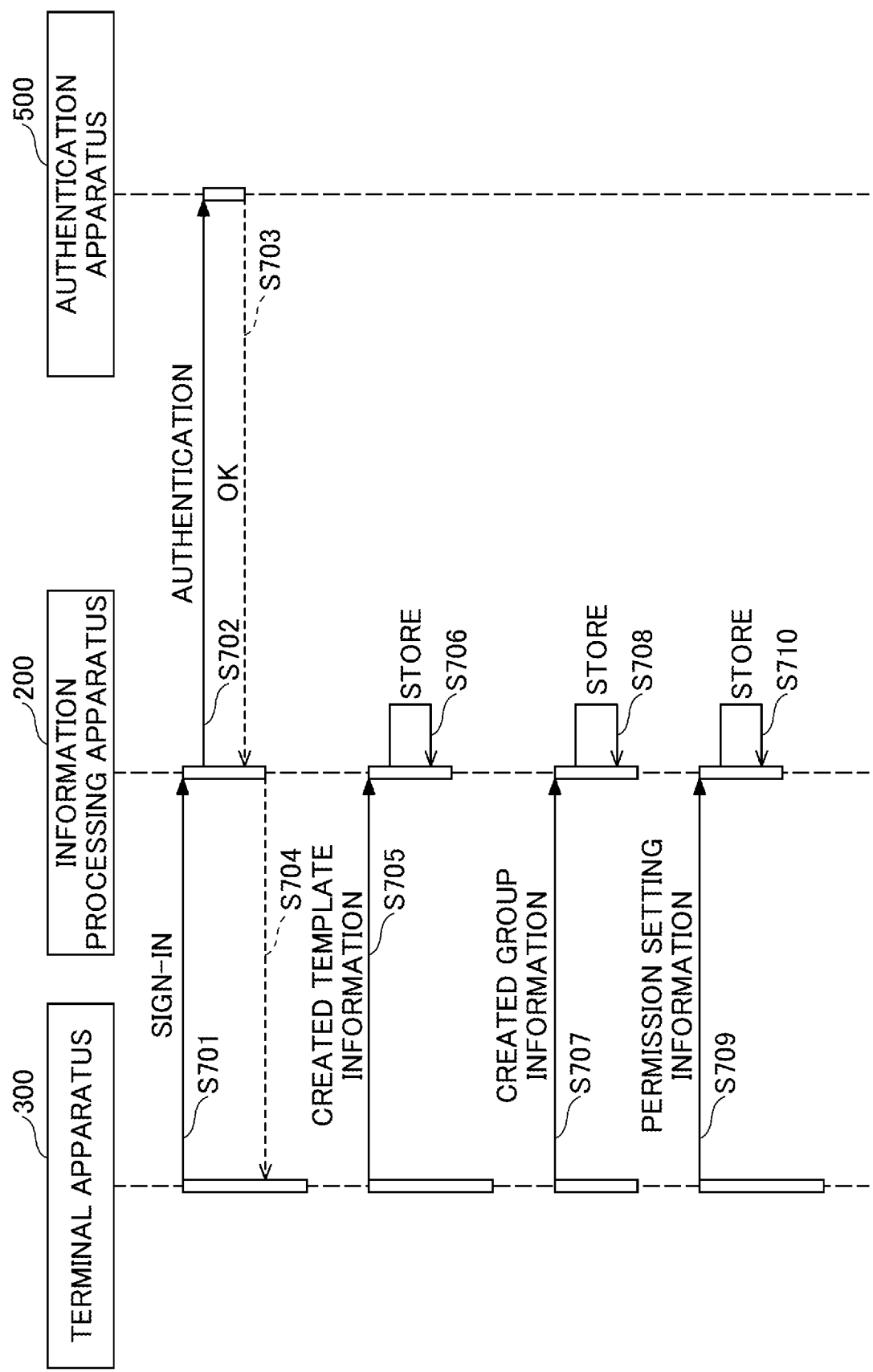

FIG.8

CREATE TEMPLATE

| TEMPLATE NAME | SAFETY AND HEALTH INSPECTION | 82a |
| WORK NAME | CORRECTION REQUEST | 82b |

IMAGE — PHOTO
DETAILS — TEXT
(82c)

| WORK NAME | IMPROVEMENT REPORT | 82d |

IMAGE — PHOTO
DETAILS — TEXT
(82e)

SET PERMISSIONS

DOCUMENT EDITING PERMISSION
- ☐ PERMIT EVERYONE
- ☑ TPL GROUP A
- ☑ TPL GROUP B (83a)

DOCUMENT POSTING PERMISSION
- ☐ PERMIT EVERYONE
- ☑ ADMINISTRATIVE GROUP X (83b)

DOCUMENT VIEWING PERMISSION
- ☑ LOCATION GROUP A
- ☐ ADMINISTRATIVE GROUP X (83c)

[ CANCEL ]    [ COMPLETE ]

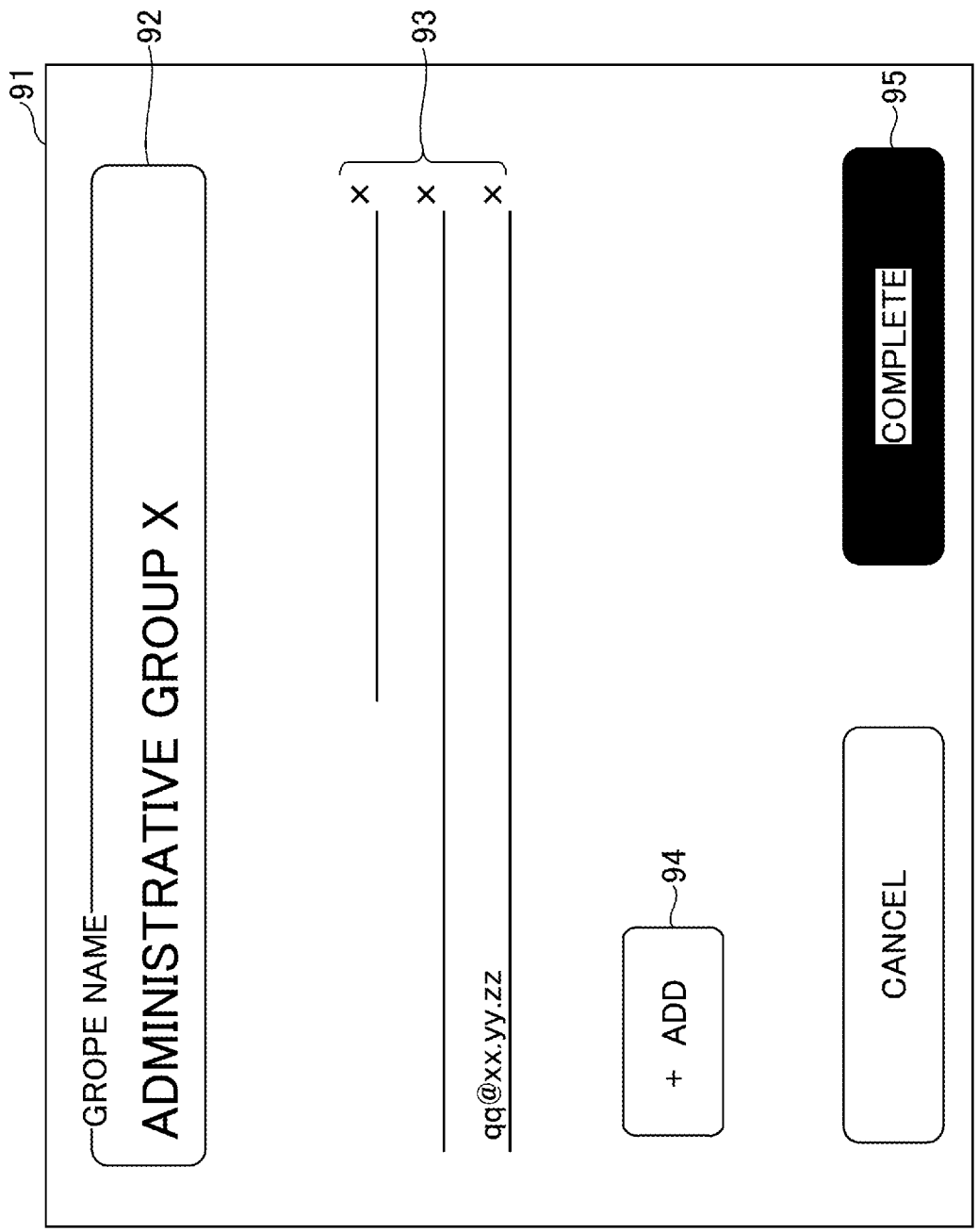

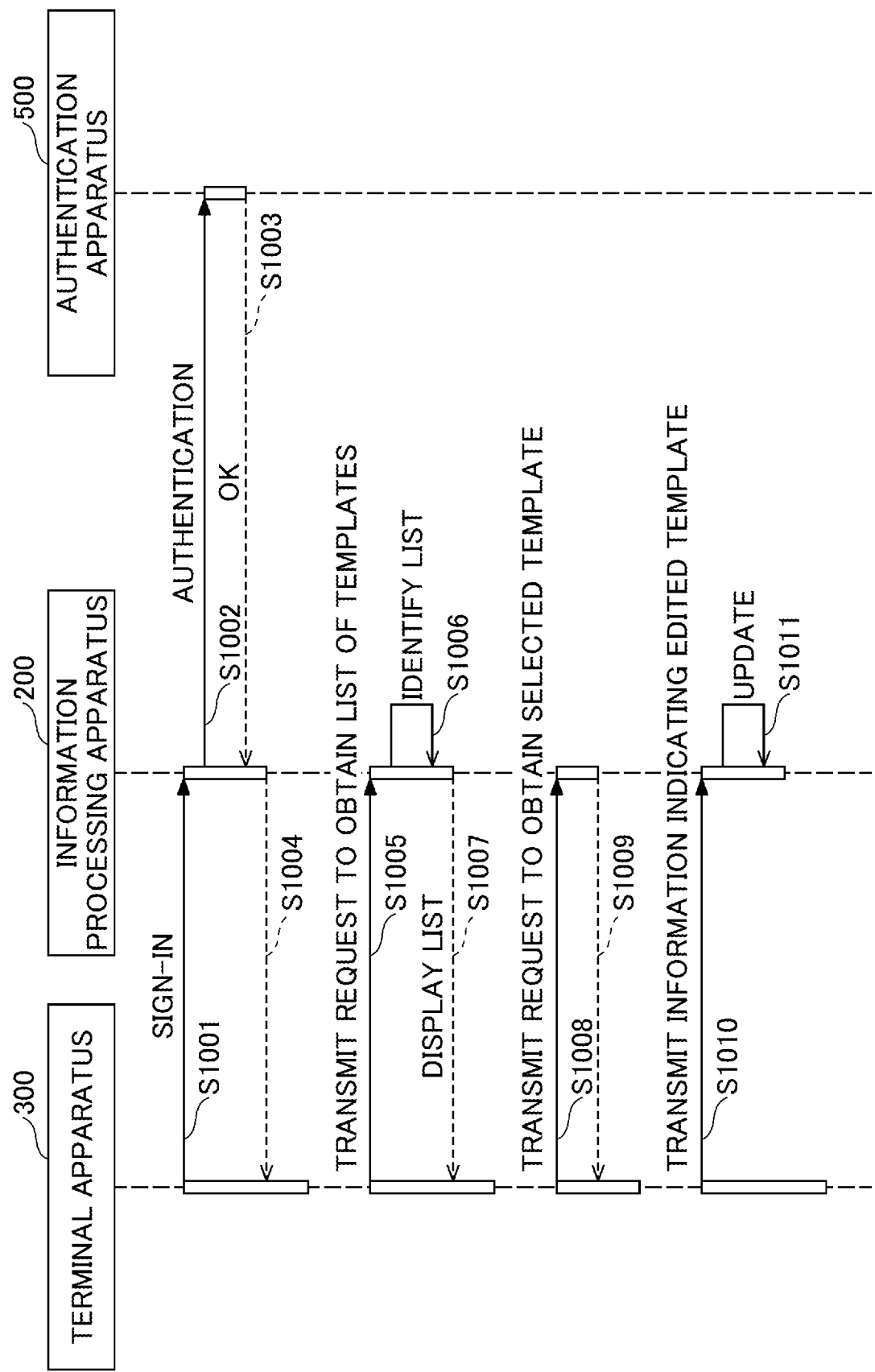

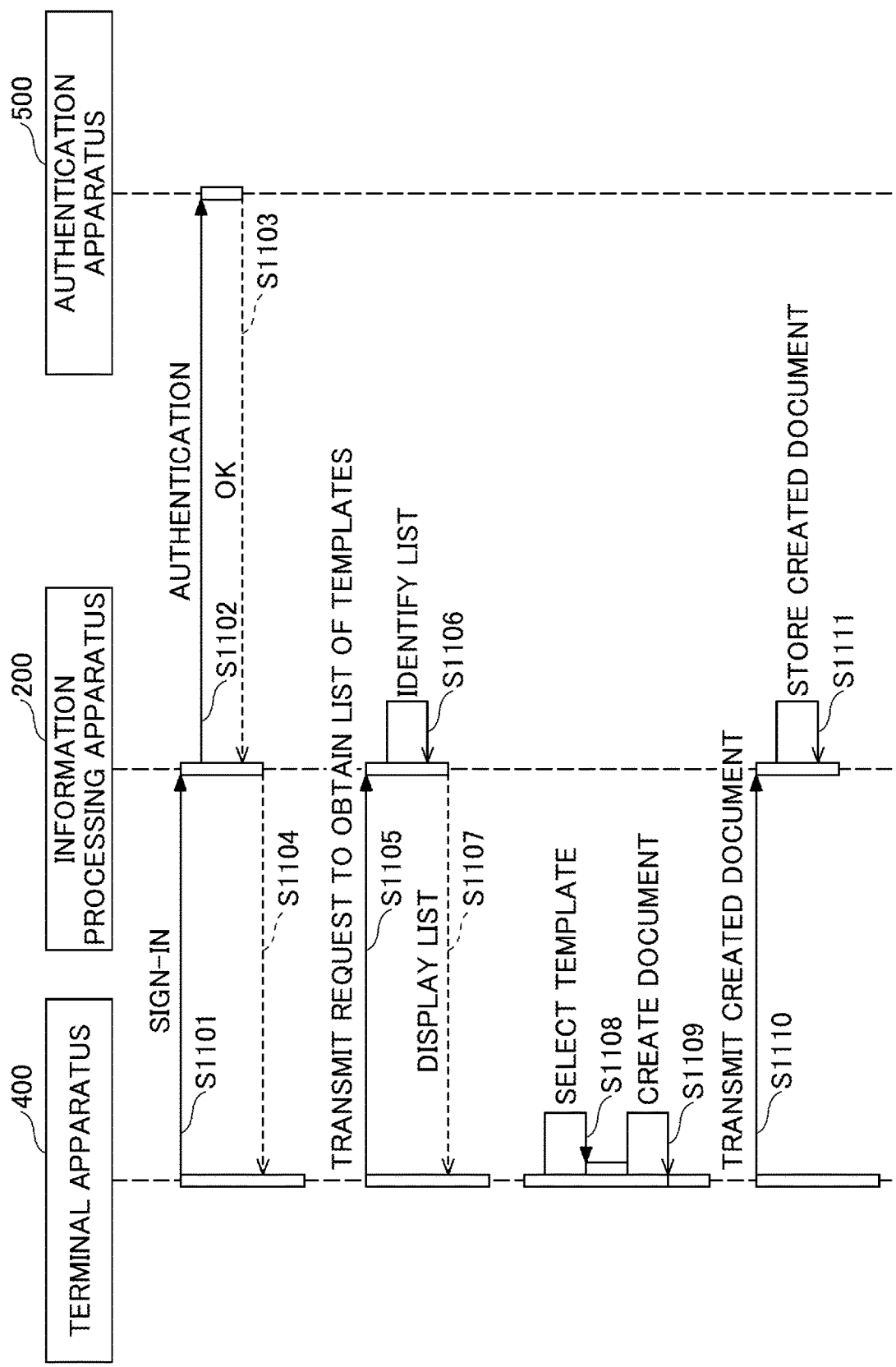

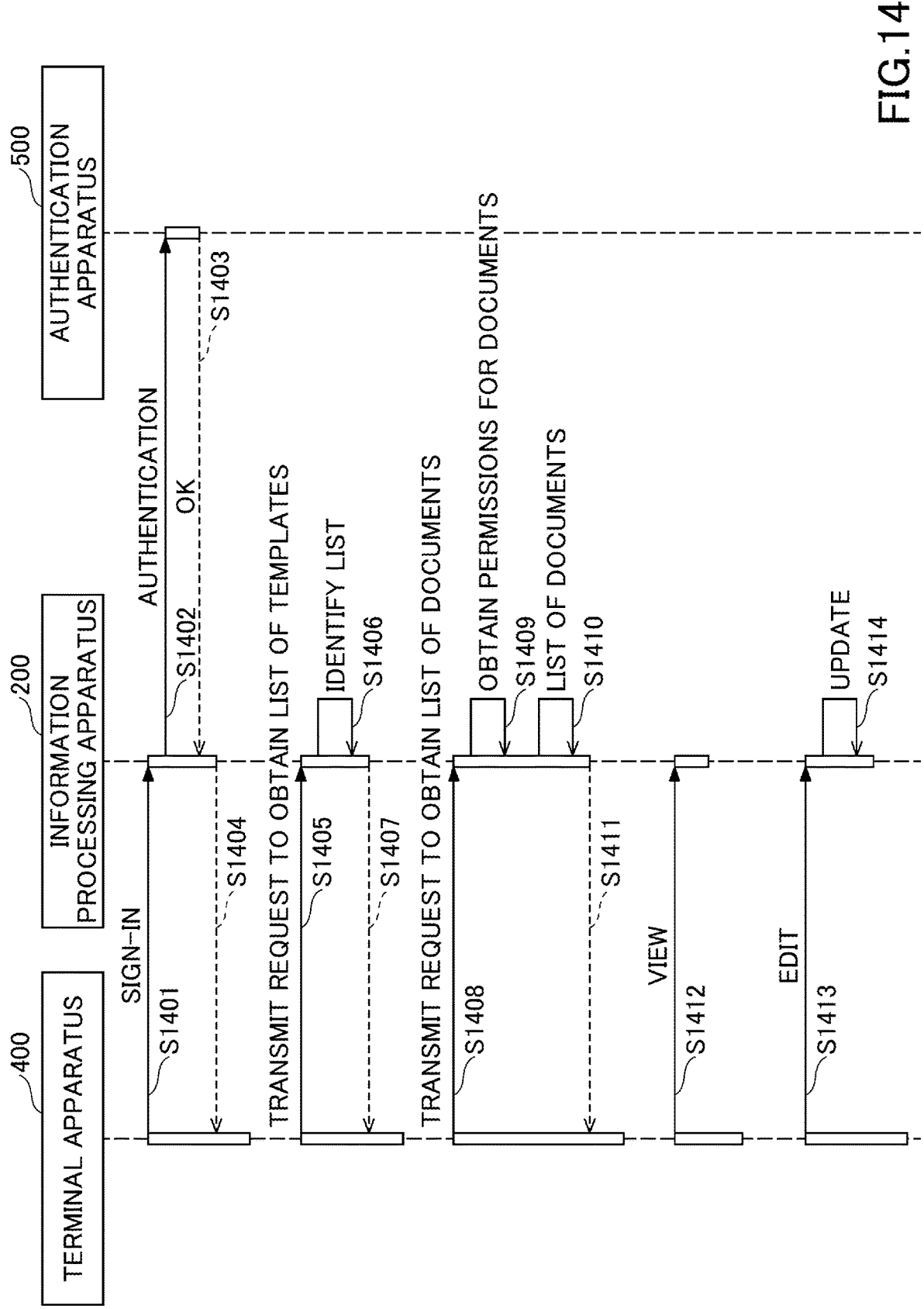

FIG.15

→ TO LIST SCREEN

SAFETY AND HEALTH INSPECTION

| DATA AND TIME POSTED ▼ | POSTED BY | REPORT IMAGE | STATUS | CATEGORY | LOCATION |
|---|---|---|---|---|---|
| 2020/10/02 13:31:58 | qq@xx.yy.zz | ◀ | NOT STARTED | POINTED OUT | 16TH FLOOR OF BUILDING C |
| 2020/10/02 10:55:55 | qq@xx.yy.zz | ◀ | NOT STARTED | ADVICE | |
| 2020/09/18 14:01:25 | qq@xx.yy.zz | ◀ | | ADVICE | |
| 2020/09/18 14:01:03 | qq@xx.yy.zz | ◀ | COMPLETED | ADVICE | 16TH FLOOR OF BUILDING C |

FIG.16

→TO LIST SCREEN

SAFETY AND HEALTH INSPECTION

| DATA AND TIME POSTED ▼ | POSTED BY | REPORT IMAGE | STATUS | CATEGORY | LOCATION |
|---|---|---|---|---|---|
| 2020/10/02 13:31:58 | qq@xx.yy.zz | ◀ | NOT STARTED | POINTED OUT | 16TH FLOOR OF BUILDING C |
| 2020/10/02 10:55:55 | qq@xx.yy.zz | ◀ | NOT STARTED | ADVICE | |
| 2020/09/18 14:01:25 | qq@xx.yy.zz | ◀ | | ADVICE | |
| 2020/09/18 14:01:03 | qq@xx.yy.zz | ◀ | COMPLETED | ADVICE | 16TH FLOOR OF BUILDING C | ered herein by reference.
INFORMATION PROCESSING APPARATUS, RECORDING MEDIUM, AND INFORMATION PROCESSING SYSTEM

CROSS-REFERENCE TO RELATED APPLICATIONS

The present application claims priority under 35 U.S.C. § 119 to Japanese Patent Application No. 2020-176094, filed on Oct. 20, 2020, the entire contents of which are incorporated herein by reference.

BACKGROUND OF THE INVENTION

1. Field of the Invention

The disclosures herein relate to an information processing apparatus, a recording medium, and an information processing system.

2. Description of the Related Art

In recent years, employees at companies and local governments have been carrying out activities to improve work procedures and the like at work sites. In such an improvement activity, for example, a situation at a work site is recorded in the form of images, memos, and the like, a request to correct the situation is made, and an improvement report is made in response to the request.

Patent Document 1 describes a system in which a document including predetermined input items is distributed from a server to a user's terminal, and the user inputs information corresponding to the input items. In this manner, the system is utilized to record on-site information.

RELATED-ART DOCUMENTS

Patent Documents

Patent Document 1: Japanese Unexamined Patent Application Publication No. 2019-144903

SUMMARY OF THE INVENTION

According to at least one embodiment, an information processing apparatus includes a memory, and a processor coupled to the memory and configured to store a template in the memory in response to the template being created; receive an input of first input information in a case where the created template is used in performing a request task; and receive an input of second input information in a case where the created template is used in performing a report task. In the template, first identification information for identifying the request task is associated with a first input item, and second identification information for identifying the report task, for the request task, is associated with a second input item. The first identification information is input in a first input field, the first input item is selected in a first selection field such that first input information corresponding to the first input item is to be input, the second information is input in a second input field, and the second input item is selected in a second selection field such that second input information corresponding to the second input item is to be input.

BRIEF DESCRIPTION OF THE DRAWINGS

Other objects and further features of the present invention will be apparent from the following detailed description when read in conjunction with the accompanying drawings, in which:

FIG. 4A is a table illustrating an example of a template permission database;

FIG. 5 is a table illustrating an example of a group database;

FIG. 7 is a first sequence diagram illustrating the operation of the information processing system;

FIG. 8 is a first diagram illustrating an example of a display screen of a terminal apparatus (administrator terminal);

FIG. 9 is a second diagram illustrating an example of a display screen of the terminal apparatus (administrator terminal);

FIG. 10 is a second sequence diagram illustrating the operation of the information processing system;

FIG. 11 is a third sequence diagram illustrating the operation of the information processing system;

FIG. 14 is a fourth sequence diagram illustrating the operation of the information processing system;

FIG. 15 is a second diagram illustrating an example of a display screen of the terminal apparatus (user terminal); and FIG. 16 is a third diagram illustrating an example of a display screen of the terminal apparatus (user terminal).

DESCRIPTION OF THE EMBODIMENTS

In the technology according to the related art, in a document distributed to a user's terminal, if an improvement activity includes a plurality of tasks such a request task and a report task, or if each task includes plurality of processes, it is difficult to manage the document settings.

In view of the above, it is an object of the present invention to manage the settings for input items associated with a plurality of tasks to be performed by users.

Figure 1:
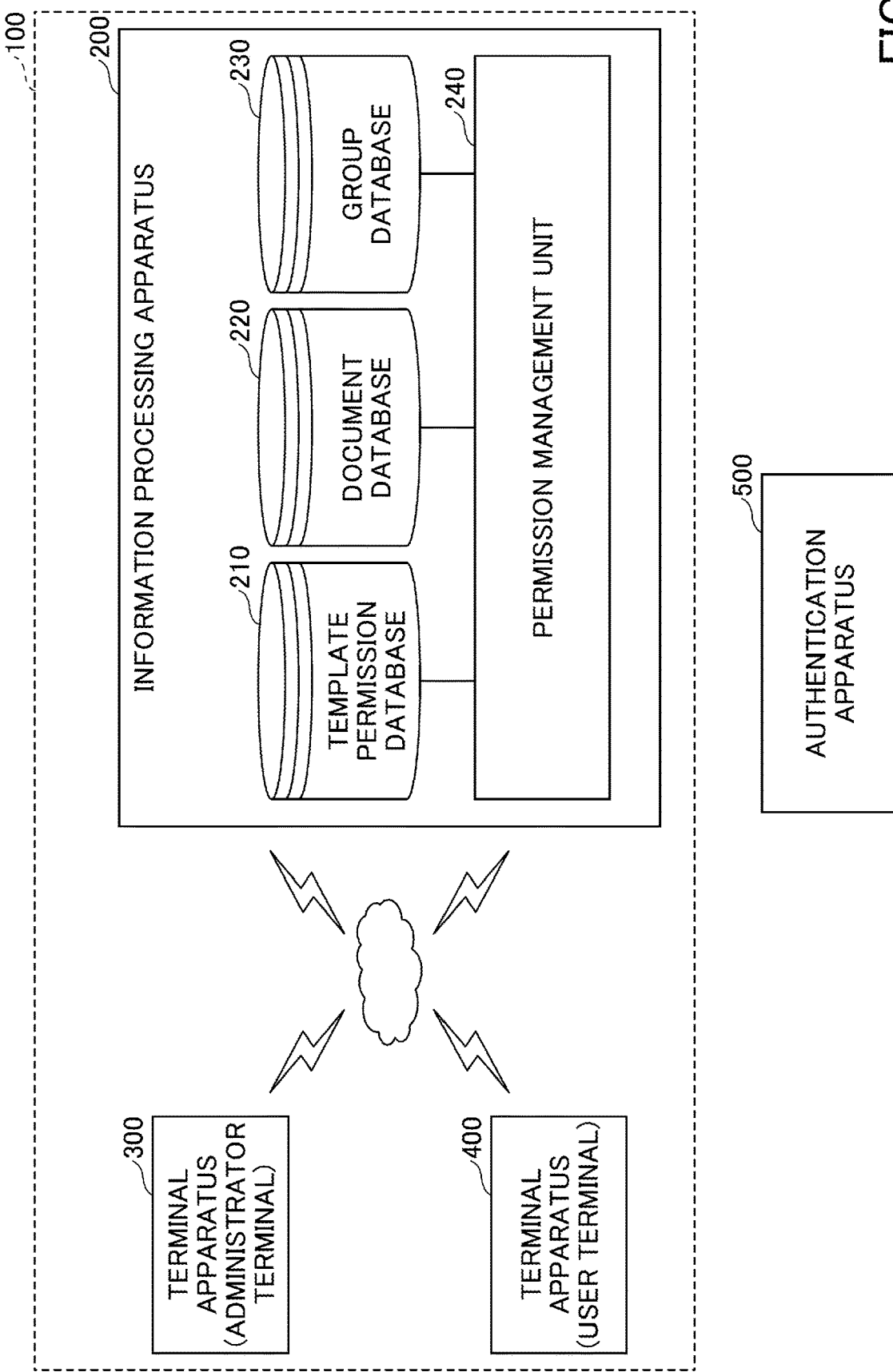
FIG. 1 is a diagram illustrating an example of the system configuration of an information processing system.

In the following, embodiments of the present invention will be described with reference to the accompanying drawings. FIG. 1 is a diagram illustrating an example of the system configuration of an information processing system.

An information processing system 100 according to an embodiment includes an information processing apparatus 200, a terminal apparatus 300, and a terminal apparatus 400. The information processing apparatus (server apparatus) 200, the terminal apparatus 300, and the terminal apparatus 400 are connected to each other via a network or the like. Further, the information processing system 100 according to the present embodiment communicates with an authentication apparatus 500. Specifically, the authentication apparatus 500 performs authentication when the user of the terminal apparatus 300 and the user of the terminal apparatus 400 sign in to the information processing system 100.

In the information processing system 100 according to the present embodiment, when predetermined data, shared between the user of the terminal apparatus 300 and the user of the terminal apparatus 400, is created, permissions for the predetermined data are set on a per user basis at the same time. Accordingly, in the present embodiment, after predetermined data is created, there is no need to perform complicated work such as setting permissions for the predetermined data for each user, thereby reducing an administrator's work burden in setting the permissions.

The information processing system 100 according to the present embodiment may be installed at each location of an organization such as a company, or may be installed at each department of the organization, for example.

In the present embodiment, an example of predetermined data shared by the user of the terminal apparatus 300 and the user of the terminal apparatus 400 is a template used to create a document or the like. As used herein, the "template" refers to data that serves as the basis for creating new document data such as a task report. The predetermined data is not limited to the template, and may be any data that can be viewed and edited by multiple users and for which permissions are to be set on a per user basis.

In the present embodiment, the terminal apparatus 300 is an administrator terminal mainly used by an administrator. In the present embodiment, for example, the administrator creates templates, edits the templates, and manages permissions for the templates. In the following description, the terminal device 300 may be referred to as an administrator terminal 300.

In the present embodiment, the terminal apparatus 400 is a user terminal mainly used by a user who uses templates. For example, the user posts (creates), views, and edits a task report created by using a template. In the following description, the terminal apparatus 400 may be referred to as a user terminal 400.

Further, In the following description, administrators and users who use the information processing system 100 may be simply referred to as users. In other words, in the present embodiment, users include administrators who manage templates and users who use the templates.

In the present embodiment, the administrator terminal 300 and the user terminal 400 may be smartphones or the like, for example. The administrator terminal 300 may be a general-purpose desktop computer or a notebook computer, for example.

The information processing apparatus 200 according to the present embodiment includes a template permission database 210, a document database 220, a group database 230, and a permission management unit 240.

The template permission database 210 stores template permission information in which a template created in the administrator terminal 300 is associated with permissions on a per user basis. That is, the template permission database 210 is an example of a template storage.

The document database 220 stores document data created based on a template. That is, the document database 220 is an example of a document storage.

The group database 230 stores group information, that is, information on groups of users.

The permission management unit 240 receives, on a per-template basis, the settings for permissions to create, edit, and view a template or document data created by using the template.

Specifically, at the time of template creation, the permission management unit 240 causes the administrator terminal 300 to display a screen that includes a template creation field and a setting filed in which permissions are set for users who use the template.

The permission management unit 240 stores, in the template permission database 210, template permission information in which the template created in the creation field displayed on the administrator terminal 300 is associated with the permissions set on a per user basis in the setting field.

In the present embodiment, as described above, an administrator can create a template and set permissions for the template on a per user basis on the same screen at the same time. Accordingly, in the present embodiment, the administrator's work burden in setting the permissions can be reduced.

Note that permissions for a template includes permission to edit the template, a permission to use the template to create document data and store the document data in the document database 220, permission to view the document data created by using the template, and permission to edit the document data created by using the template. In the following description, permission to edit a template is referred to as "template editing permission", and permission to use the template to create document data and stores the document data in the document database 220 is referred to as "document posting permission". In addition, permission to view the document data created by using the template is referred to as "document viewing permission", and permission to edit the document data created by using the template is referred to as "document editing permission".

Further, the permission management unit 240 allows a user to create, view, or edit a template or document data based on the permissions that have been granted to the user.

In the example of FIG. 1, the information processing system 100 includes the one administrator terminal 300 and the one user terminal 400; however, the present invention is not limited thereto. The information processing system 100 may include any number of administrator terminals 300 and user terminals 400.

Further, in the example of FIG. 1, the template permission database 210, the document database 220, and the group database 230 are included in the information processing apparatus 200; however, the present invention is not limited thereto. Some or all of the databases may be included in an apparatus other than the information processing apparatus 200.

Further, in the example of FIG. 1, the information processing apparatus 200 is depicted as a single apparatus; however, the present invention is not limited thereto. The information processing apparatus 200 may be implemented by a plurality of information processing apparatuses. In this case, the functions implemented by the permission management unit 240 may be implemented by the plurality of information processing apparatuses.

Figure 2:
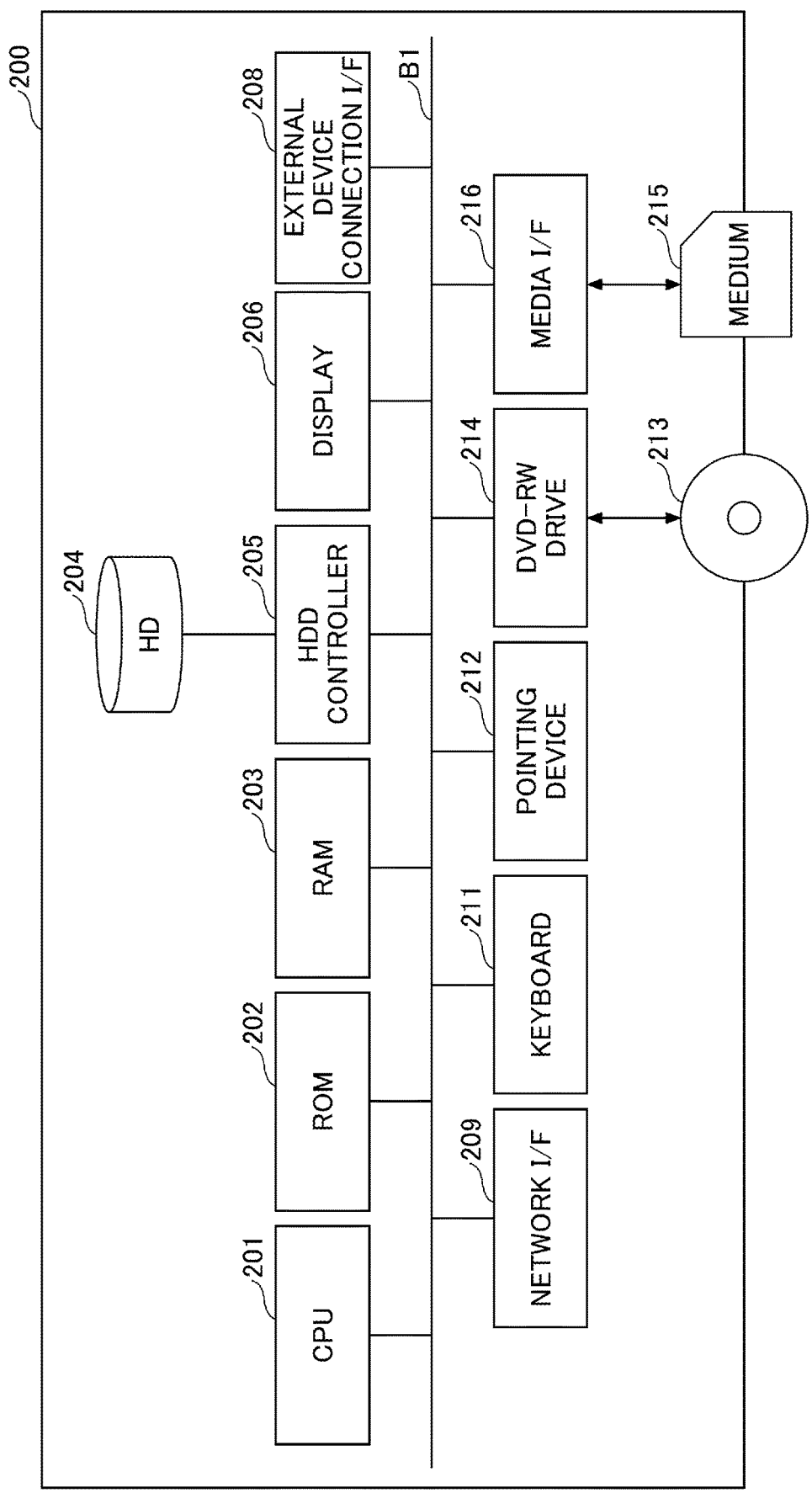
FIG. 2 is a diagram illustrating an example of the hardware configuration of an information processing apparatus.

Next, the hardware configuration of the information processing apparatus 200 will be described with reference to FIG. 2. FIG. 2 is a diagram illustrating an example of the hardware configuration of the information processing apparatus.

The information processing apparatus 200 is configured by a computer, and includes a CPU 201, a ROM 202, a RAM 203, a hard disk (HD) 204, a hard disk drive (HDD) controller 205, a display 206, an external device connection interface (I/F) 208, a network I/F 209, a bus line B1, a keyboard 211, a pointing device 212, a digital versatile disc rewritable (DVD-RW) drive 214, and a media I/F 216, as illustrated in FIG. 2.

The CPU 201 controls the operation of the entire information processing apparatus 200. The ROM 202 stores programs used to drive the CPU 201 such as an initial program loader (IPL). The RAM 203 is used as a work area for the CPU 201. The HD 204 stores various types of data such as programs. The HDD controller 205 controls the reading and writing of various types of data from and to the HD 204, as controlled by the CPU 201. The display 206 displays various types of information such as a cursor, menus, windows, characters, and images. The external device connection I/F 208 is an interface for connecting various types of external devices. Examples of the external devices include a universal serial bus (USB) memory and a printer. The network I/F 209 is an interface for data communication via a communication network. The bus line B1 electrically connects the constituent elements such as the CPU 201 as illustrated in FIG. 2.

The keyboard 211 is a type of an input device having a plurality of keys for inputting characters, numbers, and various types of instructions. The pointing device 212 is a type of an input device that selects or executes various types of instructions, selects an object to be processed, and moves the cursor. The DVD-RW drive 214 controls the reading and writing of various types of data from and to a DVD-RW 213. Note that the DVD-RW 213 is not limited to a DVD-RW, and may be a DVD-R. The media I/F 216 controls the reading and writing (storage) of data from and to (into) a recording medium 215 such as a flash memory.

Figure 3:
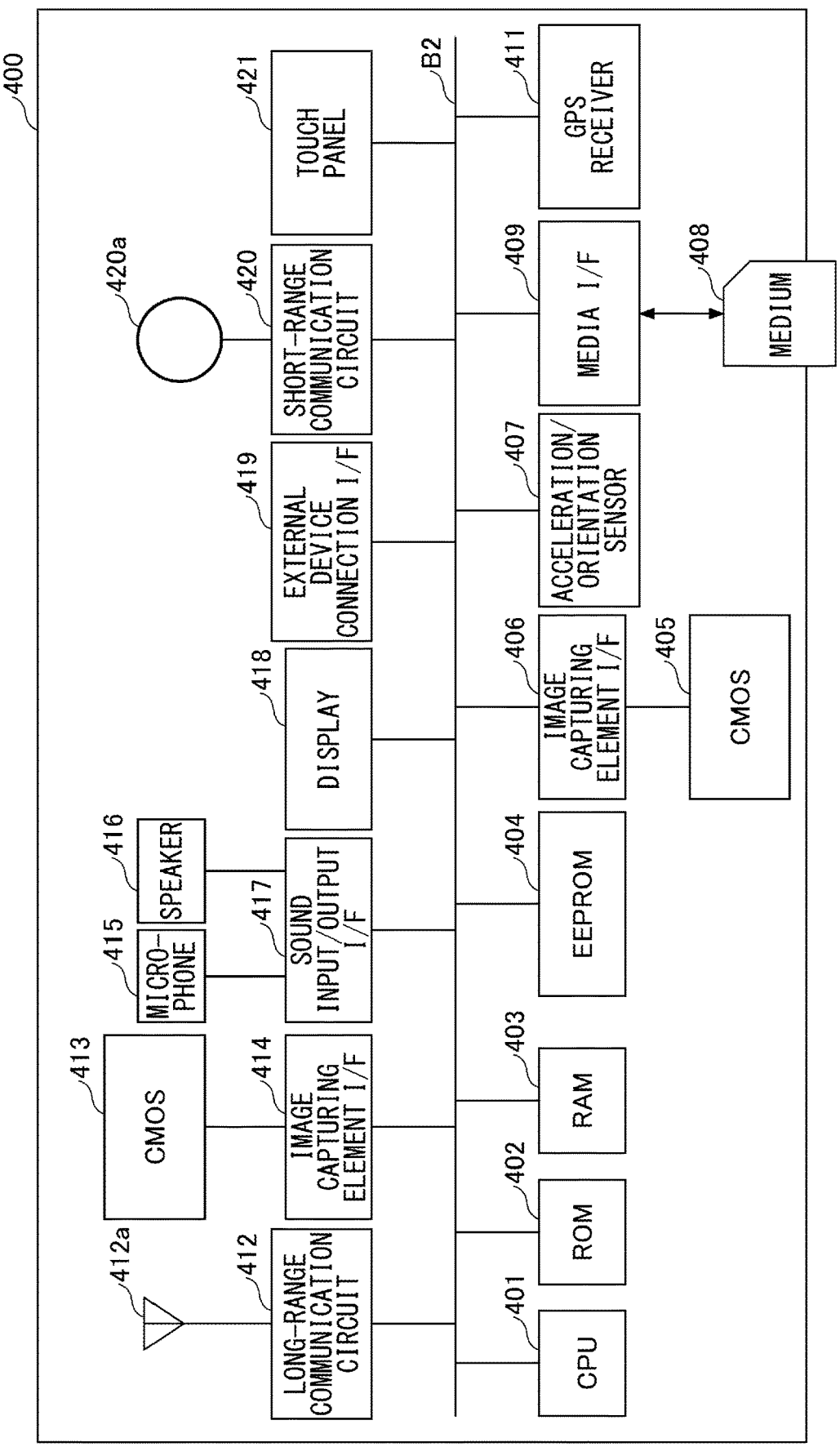
FIG. 3 is a diagram illustrating an example of the hardware configuration of a terminal apparatus.

FIG. 3 is a diagram illustrating an example of the hardware configuration of the terminal apparatus. The terminal apparatus 400 according to the present embodiment includes a CPU 401, a ROM 402, a RAM 403, an EEPROM 404, a CMOS (complementary metal oxide semiconductor) sensor 405, an image capturing element I/F 406, an acceleration/orientation sensor 407, a media I/F 409, and a GPS receiver 411.

The CPU 401 is an arithmetic processing device that controls the operation of the entire terminal apparatus 400. The ROM 402 stores a program used to drive the CPU 401, such as an IPL. The RAM 403 is used as a work area for the CPU 401. The EEPROM 404 reads and writes various types of data such as smartphone programs according to the control of the CPU 401. The ROM 402, the RAM 403, the EEPROM 404 are examples of storage devices of the terminal apparatus 400.

The CMOS sensor 405 is a type of a built-in imaging unit that captures a subject (mainly an image of a user his/herself) to obtain image data according to the control of the CPU 401. Note that the CMOS sensor 405 may be any other imaging unit such as a charge-coupled device (CCD) sensor, instead of a CMOS sensor.

The imaging capturing element I/F 406 is a circuit that controls the driving of the CMOS sensor 405. The acceleration/orientation sensor 407 is a type of sensor, such as an electromagnetic compass, a gyrocompass, or an acceleration sensor, that detects the geomagnetic field. The media I/F 409 controls the reading and writing (storage) of data from and to a recording medium 408 such as a flash memory. The GPS receiver 411 receives a GPS signal from a GPS satellite.

The terminal apparatus 400 includes a long-range communication circuit 412, an antenna 412a of the long-range communication circuit 412, a CMOS sensor 413, an image capturing element I/F 414, a microphone 415, a speaker 416, a sound input/output I/F 417, a display 418, an external device connection I/F 419, a short-range communication circuit 420, an antenna 420a of the short-range communication circuit 420, and a touch panel 421.

The long-range communication circuit 412 is a circuit that communicates with other devices via a communication network. The CMOS sensor 413 is a type of a built-in image capturing unit that captures a subject to obtain image data according to the control of the CPU 401. The imaging element I/F 414 is a circuit that controls the driving of the CMOS sensor 413. The microphone 415 is a built-in circuit that converts sound to an electrical signal. The speaker 416 is a built-in circuit that converts an electrical signal into physical vibrations to produce sounds, such as music and speech. The sound input/output I/F 417 is a circuit that processes the input and output of a sound signal between the microphone 415 and the speaker 416 according to the control of the CPU 401.

The display 418 is a type of a display unit such as a liquid crystal display or an organic electroluminescent (EL) display that displays an image of a subject or various icons. The external device connection I/F 419 is an interface for connecting various external devices. The short-range communication circuit 420 is a communication circuit such as near-field communication (NFC) or Bluetooth (registered trademark). The touch panel 421 is a type of an input unit for operating the terminal apparatus 400 by the user pressing the display 418. The display 418 is an example of a display unit included in the terminal apparatus 400.

The hardware configuration of the administrator terminal 300 according to the present embodiment may be similar to that illustrated in FIG. 2 if the administrator terminal 300 is a desktop computer or the like, or may be similar to that illustrated in FIG. 3 if the administrator terminal 300 is a smartphone or the like.

Next, the databases included in the information processing apparatus 200 will be described with reference to FIG. 4A, FIG. 4B, and FIG. 5.

FIG. 4A is a table illustrating an example of the template permission database. The template permission database 210 according to the present embodiment includes, as information items, a "template ID", a "template administrative permission", a "document posting permission", a "document viewing permission, a "document editing permission", and a "template". The item "template ID" is associated with the other items. In the template permission database 210 according to the present embodiment, information that includes the value of the item "template ID" and the values of the other items is referred to as "template permission information".

The value of the item "template ID" is identification information for identifying a template. The value of the item "template administrative permission" indicates information for identifying a group that has been granted permission to manage the template. Specifically, the permission to manage the template includes permission to edit the template.

The value of the item "document posting permission" indicates information for identifying a group that has been granted permission to use the template associated with the corresponding template ID to create document data, and store the created document data in the document database 220.

The value of the item "document viewing permission" indicates information for identifying a group that has been granted permission to view the document data created by using the template associated with the corresponding template ID.

The value of the item "document editing permission" indicates information for identifying a group that has been granted permission to edit the template associated with the corresponding template ID.

In the example of FIG. 4A, the name of a group is used as information for identifying the group. However, information for identifying a group is not limited to the name of the group, and may be identification information assigned to each group.

The value of the item "template" indicates the template associated with the corresponding template ID.

In the example of FIG. 4A, it can be seen that permission to edit a template called "safety and health inspection" associated with template ID "1" has been granted to "tpl group A" and "tpl group B". Further, it can be seen that document posting permission and document editing permission for the template have been granted to "administrative group X", and document viewing permission for the template has been granted to "location group A".

Figure 4B:
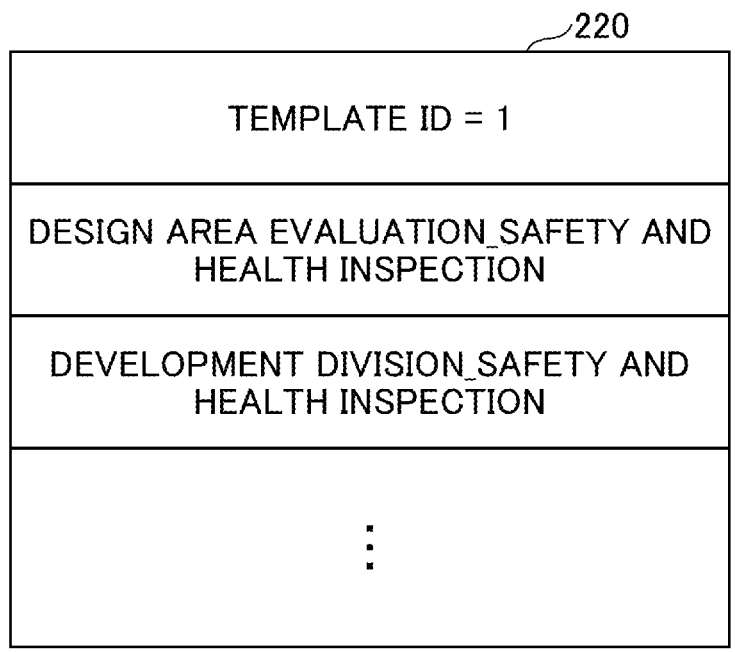
FIG. 4B is a table illustrating an example of a document database.

FIG. 4B is a table illustrating an example of the document database. The document database 220 is provided for each template ID. In the example of FIG. 4B, document data created by using the template associated with the template ID "1" is stored in the document database 220.

In the present embodiment, templates may be used to create task reports, and document data may be task reports created by using templates.

FIG. 5 is a table illustrating an example of the group database. The group database 230 according to the present embodiment includes, as information items, a "group ID", a "group name", and a "registered user". The group ID is associated with the other items. In the group database 230 according to the present embodiment, information in which the value of the item "group ID" is associated with the values of the other items is referred to as "group information".

The value of the item "group ID" is identification information for identifying a group. The value of the item "group name" indicates the name of the group. The value of the item "registered user" indicates information for identifying a user belonging to the group associated with the corresponding group ID. In the present embodiment, an email address is used as information for identifying a user; however, the present invention is not limited thereto. information for identifying a user may be an employee ID (user ID) or the like. In other words, the value of the item "registered user" may be any user information for identifying a user.

Figure 6:
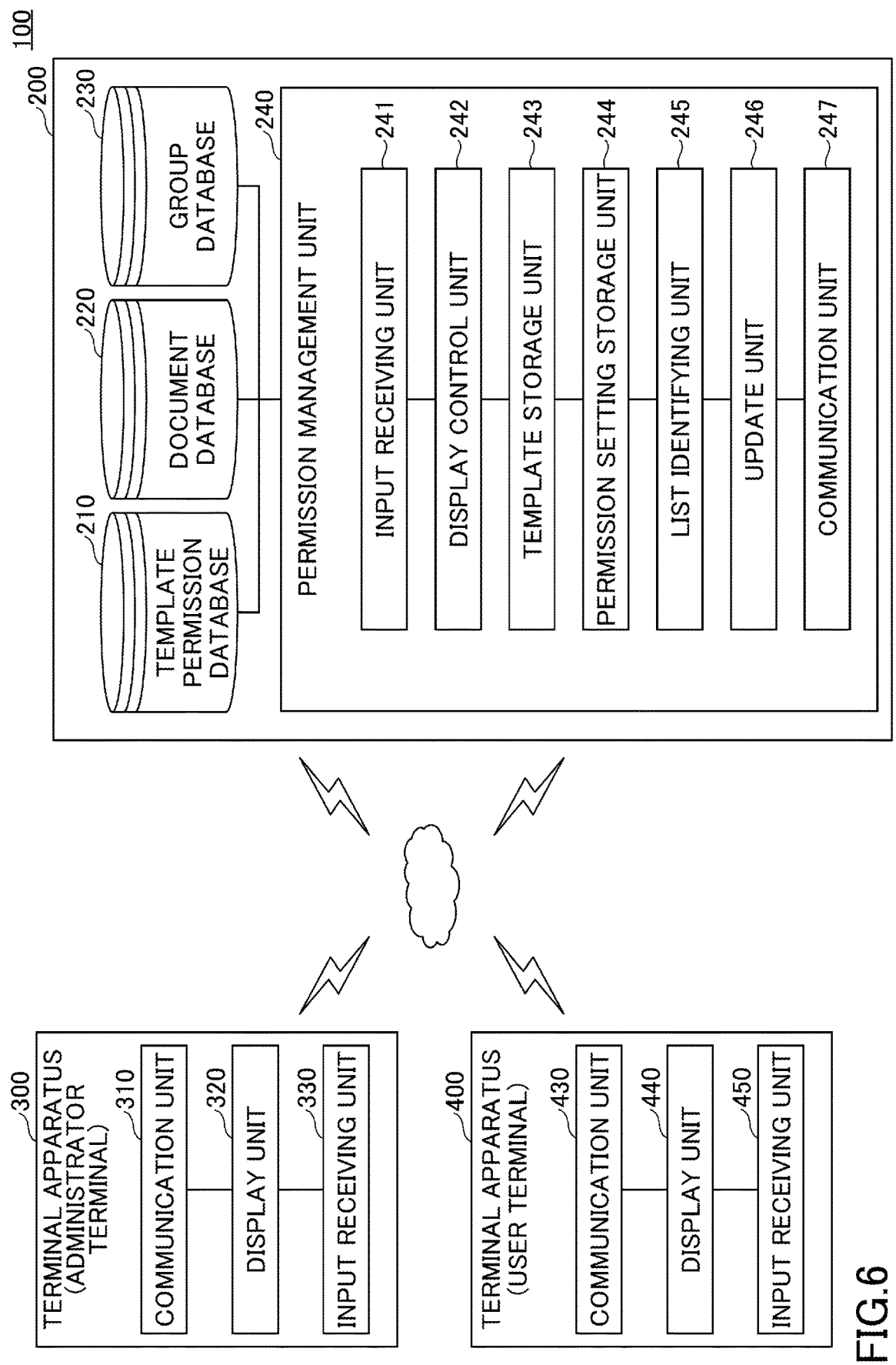
FIG. 6 is a diagram illustrating the functional configuration of each apparatus of the information processing system.

Next, the functional configuration of each of the apparatuses included in the information processing system 100 will be described with reference to FIG. 6. FIG. 6 is a diagram illustrating the functional configuration of each of the apparatuses of the information processing system.

First, functions of the information processing apparatus 200 will be described. In the present embodiment, the permission management unit 240 of the information processing apparatus 200 includes an input receiving unit 241, a display control unit 242, a template storage unit 243, a permission setting storage unit 244, a list identifying unit 245, an update unit 246, and a communication unit 247.

The input receiving unit 241 receives various inputs with respect to the information processing apparatus 200. Specifically, the input receiving unit 241 receives input information for identifying a task for which a template is created, input information related to the task, such as results of performing the task, and the like. Further, the input receiving unit 241 of the permission management unit 240 receives requests to execute various processes, input information to be stored in each database, and the like. In response to information being input into a template in the user terminal 400, the input receiving unit 241 receives the input information from the user terminal 400.

The display control unit 242 controls the display of the administrator terminal 300 and the display of the user terminal 400. Specifically, the display control unit 242 generates screen data, outputs the screen data to the administrator terminal 300 and the user terminal 400, and causes the display device of each of the administrator terminal 300 and the user terminal 400 to display the screen data. Note that in addition to controlling the display of the display device or the touch panel of each of the administrator terminal 300 and the user terminal 400, the display control unit 242 may also control the display 206 of the information processing apparatus 200, for example.

The template storage unit 243 creates a template based on the input information received by the input receiving unit 241, assigns a template ID to the template, and stores the template in the template permission database 210.

The permission setting storage unit 244 associates permissions with the template on a per user basis based on the input information received from the administrator terminal 300, and stores the permissions associated with the template in the template permission database 210. Note that in the present embodiment, permissions are set on a per user group basis. Further, "permissions on a per user basis" and "permissions on a per user group basis" are used interchangeably.

The list identifying unit 245 identifies a list of templates for which a user of user information received from the user terminal 400 has a corresponding permission.

The update unit 246 updates the template permission database 210, the document database 220, and the group database 230 based on the input information received by the input receiving unit 241 from the administrator terminal 300 or the user terminal 400.

The communication unit 247 transmits information from the information processing apparatus 200 to other apparatuses. In addition, the communication unit 247 receives information transmitted from the other apparatuses to the information processing apparatus 200. The other apparatuses may be the administrator terminal 300, the user terminal 400, the authentication apparatus 500, and the like.

Next, functions of the administrator terminal 300 will be described. The administrator terminal 300 according to the present embodiment includes a communication unit 310, a display unit 320, and an input receiving unit 330. The communication unit 310 transmits and receives information between the administrator terminal 300 and other apparatuses. The display unit 320 displays information on the display device of the administrator terminal 300. For example, the display unit 320 may display, on the display device, information received by the communication unit 310 from the information processing apparatus 200. The display device may be a display, a touch panel, or the like, for example.

The input receiving unit 330 receives information input with respect to the administrator terminal 300. For example, the communication unit 310 transmits the input information to the information processing apparatus 200.

Next, functions of the user terminal 400 will be described. The user terminal 400 includes a communication unit 430, a display unit 440, and an input receiving unit 450. The functions of the communication unit 430, the display unit 440, and the input receiving unit 450 of the user terminal 400 are the same as the functions of the communication unit 310, the display unit 320, and the input receiving unit 330, and thus the description thereof will not be repeated.

Next, an example of the operation of the information processing system 100 according to the present embodiment will be described with reference to FIG. 7. FIG. 7 is a first sequence diagram illustrating the operation of the information processing system. In FIG. 7, the operation of the information processing system 100 when the administrator stores template permission information in the template permission database 210 will be described.

In the information processing system 100, the administrator terminal 300 sends a sign-in request to the information processing apparatus 200 (step S701). Specifically, the input receiving unit 330 of the administrator terminal 300 receives an input of user information such as an email address, a password, and the like, and the communication unit 310 transmits the user information to the information processing apparatus 200.

Note that, when a user performs an operation for instructing to create a template, the administrator terminal 300 may send the sign-in request to the information processing apparatus 200, together with a request to create a template.

When receiving the user information, such as the email address, the communication unit 247 of the information processing apparatus 200 transmits the user information, and an authentication request to the authentication apparatus 500 (step S702), and receives authentication results (step S703). Note that FIG. 7 depicts an example in which the user of the administrator terminal 300 has been successfully authenticated based on the user information.

When receiving the authentication results, the display control unit 242 of the permission management unit 240 of the information processing apparatus 200 generates screen data for displaying a template creation field and an authentication setting field, and transmits (outputs) the screen data to the administrator terminal 300 (step S704).

In other words, when the input receiving unit 241 of the information processing apparatus 200 receives a request to create a template, the display control unit 242 causes the administrator terminal 300 to display a creation screen that includes the template creation field and the authentication setting field in which permissions are set for the template on a per user basis. Details of the creation screen will be described later.

When the input receiving unit 330 of the administrator terminal 300 receives information input in the template creation field, the communication unit 310 transmits the input information to the information processing apparatus 200 (step S705). The information input in the template creation field is, for example, information related to a task.

When the input receiving unit 241 of the information processing apparatus 200 receives the information input in the template creation field, the template storage unit 243 assigns a template ID to the template based on the input information, associates the template ID with the template, and stores the template associated with the template ID in the template permission database 210 (step S706).

Then, the administrator terminal 300 displays a group creation screen, and transmits information input on the group creation screen to the information processing apparatus 200 (step S707). Note that the administrator terminal 300 may display the group creation screen upon the input in the creation field of the creation screen being completed.

The information input on the group creation screen is, for example, user information, and specifically an email address.

When receiving the information input on the group creation screen, the information processing apparatus 200 causes the permission setting storage unit 244 to store the input information in the group database 230 (step S708).

Next, when the input receiving unit 330 of the administrator terminal 300 receives information input in the permission setting field, the communication unit 310 transmits the input information to the information processing apparatus 200 (step S709). The information input in the permission setting field includes information relating to template editing permission, document posting permission, document editing permission, and document viewing permission.

When the input receiving unit 241 of the information processing apparatus 200 receives the information input in the permission setting field, the permission setting storage unit 244 associates the information with the template ID, and stores the information associated with the template ID in the template permission database 210 (step S710).

In the example of FIG. 7, the information input on the group creation screen is stored in the group database 230 after the template associated with the template ID is stored in the template permission database 210. However, the order of the steps in the above-described process is not limited thereto.

In the present embodiment, for example, before the template associated with the template ID is stored in the template permission database 210, the administrator terminal 300 may display the group creation screen, and the information input on the group creation screen may be stored in the group database 230.

In the following, examples of display screens of the administrator terminal 300 will be described with reference to FIG. 8 and FIG. 9. FIG. 8 is a first diagram illustrating an example of a display screen of the terminal apparatus (administrator terminal).

A screen 81 illustrated in FIG. 8 is an example of the creation screen displayed on the administrator terminal 300 in step S704 of FIG. 7.

The screen 81 includes a creation field 82, a setting field 83, an operation member 84, and an operation member 85. The creation field 82 is a field in which information related to tasks is input such that a template is created. The setting field 83 is a field in which permissions are set for the template created based on the information input in the creation field 82.

The operation member 84 is an operation member for transmitting information input on the screen 81 (input content) to the information processing apparatus 200. The operation member 85 is an operation member for scrolling to view a particular portion displayed on the display device of the administrator terminal 300.

The creation field 82 includes an input fields 82a, 82b, and 82d and selection fields 82c and 82e. In the input field 82a, a template name is input. In the example of FIG. 8, "safety and health inspection" is input as a template name.

In the input field 82b and the input field 82d, the names of the tasks are input. In other words, in the input field 82b and the input field 82d, information for identifying the tasks is input.

In the selection fields 82c and 82e, input items associated with the tasks, which were input in the input field 82b and the input field 82d, are selected such that information corresponding to the input items are to be input.

Accordingly, in a template created by using the creation field 82, input items are associated with a corresponding task. That is, input items associated with a corresponding task can be selected such that information corresponding to the input items are to be input.

In the input field 82b, the name of a task "correction request" is input. In the selection field 82c, items associated with the task, input in the input field 82b, are selected such that information corresponding to the items is to be input. In the example of FIG. 8, in the selection field 82c, items "photo" and "text" associated with the task "correction request" are selected such that information corresponding to the items "photo" and "text" are to be input in association with the task "correction request". On the screen 81, the selection field 82*c* includes item names "image" and "report details".

Similar to the input field 82*b*, in the input field 82*d*, the name of a task "improvement report" is input. In the selection field 82*e*, items "photo" and "text" associated with the task "improvement report" are selected such that information corresponding to the items is to be input. On the screen 81, the selection field 82*e* includes item names "image" and "report details".

As described above, in the present embodiment, a template is created by using the creation field 82 that includes a plurality of display fields. In the creation field 82, input fields in which information identifying tasks are input are associated with selection fields in which input items are selected such that information corresponding to the input items are to be input. Accordingly, in the present embodiment, the settings for input items associated with a corresponding task, which is to be performed by a user, can be managed.

The setting field 83 includes selection fields 83*a*, 83*b*, and 83*c*. The selection field 83*a* displays a list of groups that includes users who can be selected as template administrators. In other words, the election field 83*a* displays a list of groups to which the template editing permission can be assigned.

In the example of FIG. 8, in the selection field 83*a*, the "tpl group A" is selected. It can be seen that the template editing permission is assigned to users belonging to the tpl group A.

The selection field 83*b* displays a list of groups to which the document posting permission can be assigned. In the example of FIG. 8, in the selection field 83*b*, the "administrative group xx" is selected. That is, in the example of FIG. 8, it can be seen that the permission to create task report data by using the template "safety and health inspection" and to store the task report data in the document database 220 is assigned to users belonging to the "administrative group xx".

The selection field 83*c* displays a list of groups to which the document viewing permission can be assigned. In the example of FIG. 8, in the selection field 83*c*, the "location group A" is selected. That is, in the example of FIG. 8, it can be seen that the permission to view the task report data created by using the template "safety and health inspection", from among task report data stored in the document database 220, is assigned to users belonging to the "location group A".

In the present embodiment, for example, in response to the operation member 84 being operated after the input in the creation field 82 is completed, the contents input in the creation field 82 may be transmitted to the information processing apparatus 200. Further, in the present embodiment, in response to the operation member 84 being operated after the settings in the setting field 83 are completed, the contents set in the setting field 83 may be transmitted to the information processing apparatus 200. Further, in present embodiment, in response to the operation member 84 being operated after the input in the creation field 82 and the settings in the setting field 83 are completed, the contents input in the creation field 82 and the contents set in the setting field 83 may be simultaneously transmitted to the information processing apparatus 200.

FIG. 9 is a second diagram illustrating an example of a display screen of the terminal apparatus (administrator terminal). The screen 91 illustrated in FIG. 9 is as example of the group creation screen for creating a group.

The screen 91 includes input fields 92 and 93 and operation buttons 94 and 95. The input field 92 is an input field in which a group name is input. The input field 93 is an input field in which an email address (user information) of a user belonging to the group identified by the group name is input.

The operation button 94 is an operation button for adding the user, whose email address is input in the input field 93, to the group. In response to the operation button 94 being operated on the screen 91, the information processing apparatus 200 associates the email address, input in the input field 92, with the group name, and stores the email address associated with the group name in the group database 230.

The operation button 95 is an operation button for completing the creation of the group. In the present embodiment, for example, in response to the operation button 95 being operated, the screen 91 displayed on the administrator terminal 300 may transition.

As described above, in the present embodiment, various permissions for each template are set on a per user group basis when each of the templates is created. Therefore, in the present embodiment, it is not required to separately set permissions on a per user basis. The permissions can be granted (assigned) to users at the same time when the creation of a template is completed.

Next, another example of the operation of the information processing system 100 according to the present embodiment will be described with reference to FIG. 10. FIG. 10 is a second sequence diagram illustrating the operation of the information processing system. In FIG. 10 the operation of the information processing system 100 when the administrator edits a template stored in the template permission database 210 will be described.

Steps S1001 through step S1004 of FIG. 10 are similar to step S701 through step S704 of FIG. 7, and thus the description thereof will not be repeated.

When the administrator terminal 300 receives an operation for obtaining templates, the administrator terminal 300 transmits a request to obtain a list of templates to the information processing apparatus 200 and the like (step S1005). The request to obtain a list of templates includes the email address of the administrator who performed the operation for obtaining templates.

When the information processing apparatus 200 receives the request to obtain a list of templates, the list identifying unit 245 of the information processing apparatus 200 identifies a list of templates for which the administrator, who performed the operation for obtaining templates, has document editing permission (step S1006).

Specifically, the list identifying unit 245 refers to the item "document editing permission" of the template permission database 210, and extracts template IDs associated with a group ID that includes the email address of the administrator. Then, the list identifying unit 245 identifies a list of templates associated with the extracted template IDs. Details of step S1006 will be described later.

Next, the communication unit 247 of the information processing apparatus 200 transmits the identified list of templates to the administrator terminal 300, and causes the administrator terminal 300 to display the list of templates (step S1007). The list of templates includes the template IDs of the templates included in the list.

When the administrator terminal 300 receives an operation for selecting a template from the list of templates, the administrator terminal 300 transmits a request to obtain the selected template to the information processing apparatus 200 (step S1008). In response to receiving the request, the information processing apparatus 200 transmits the selected template to the administrator terminal 300, and causes the administrator terminal 300 to display the selected template (step S1009).

When the administrator terminal 300 receives an operation for editing the template, the administrator terminal 300 transmits information indicating the contents of the edited template to the information processing apparatus 200 (step S1010).

When the information processing apparatus 200 receives the information indicating the contents of the edited template, the information processing apparatus 200 causes the update unit 246 to update the template stored in the template permission database 210 (step S1011).

Next, the operation of the information processing system 100 when a template is used by the user of the user terminal 400 will be described with reference to FIG. 11. FIG. 11 is a third sequence diagram illustrating the operation of the information processing system. In FIG. 11, the operation of the information processing system 100 when the user uses a template to create a task report and stores the task report in the document database 220 will be described.

Steps S1101 through step S1104 of FIG. 11 are similar to step S701 through step S704 of FIG. 7, except that the user of the user terminal 400 signs in, and thus the description thereof will not be repeated.

When the user terminal 400 receives an operation for obtaining templates, the user terminal 400 transmits a request to obtain a list of templates to the information processing apparatus 200 and the like (step S1105). The request to obtain a list of templates includes the email address of the user who performed the operation for obtaining templates. Further, in FIG. 11, in response to receiving an operation for creating task report data, the user terminal 400 may transmit the request to obtain a list of templates to the information processing apparatus 200, together with a request to create task report data.

When the input receiving unit 241 of the information processing apparatus 200 receives the request to obtain a list of templates and the request to create task report data, the list identifying unit 245 identifies a list of templates for which the user, who performed the operation for obtaining templates, has document posting permission (step S1106). Details of step S1106 will be described later.

Next, the communication unit 247 of the information processing apparatus 200 transmits the identified list of templates to the user terminal 400, and causes the user terminal 400 to display the list of templates (step S1107).

The user terminal 400 receives an operation for selecting a template from the list of templates (step S1108).

Next, the user terminal 400 causes the display unit 440 to display the selected template, and creates task report data based on input information received by the input receiving unit 450 (step S1109).

In this example, it is assumed that the template created by using the creation field 82 of FIG. 8 is displayed. Specifically, the communication unit 430 of the user terminal 400 receives the selected template from the information processing apparatus 200, and the display unit 440 displays the received template.

For example, in the case of the work "correction request", when the user terminal 400 receives a selection of one of the items "photo" and "text" associated with the task "correction request", information corresponding to the selected item can be input.

Next, the user terminal 400 transmits the created task report data to the information processing apparatus 200 (step S1110). At this time, the user terminal 400 may transmit the task report data to the information processing apparatus 200, together with a template ID associated with the template selected in step S1108.

As described above, in the present embodiment, the user terminal 400 causes the display unit 440 to display a template, selected from among templates received from the information processing apparatus 200. Then, the input receiving unit 450 receives input information for items associated with work performed. The communication unit 430 of the user terminal 400 transmits the input information for the items associated with the work, which is entered by using the template, to the information processing apparatus 200.

In response to receiving the task report data together with the template ID, the information processing apparatus 200 causes the update unit 246 to update the document database 220 (step S1111). Specifically, the update unit 246 associates the task report data with the template ID, and stores the task report data associated with the template ID in the document database 220.

Figure 12:
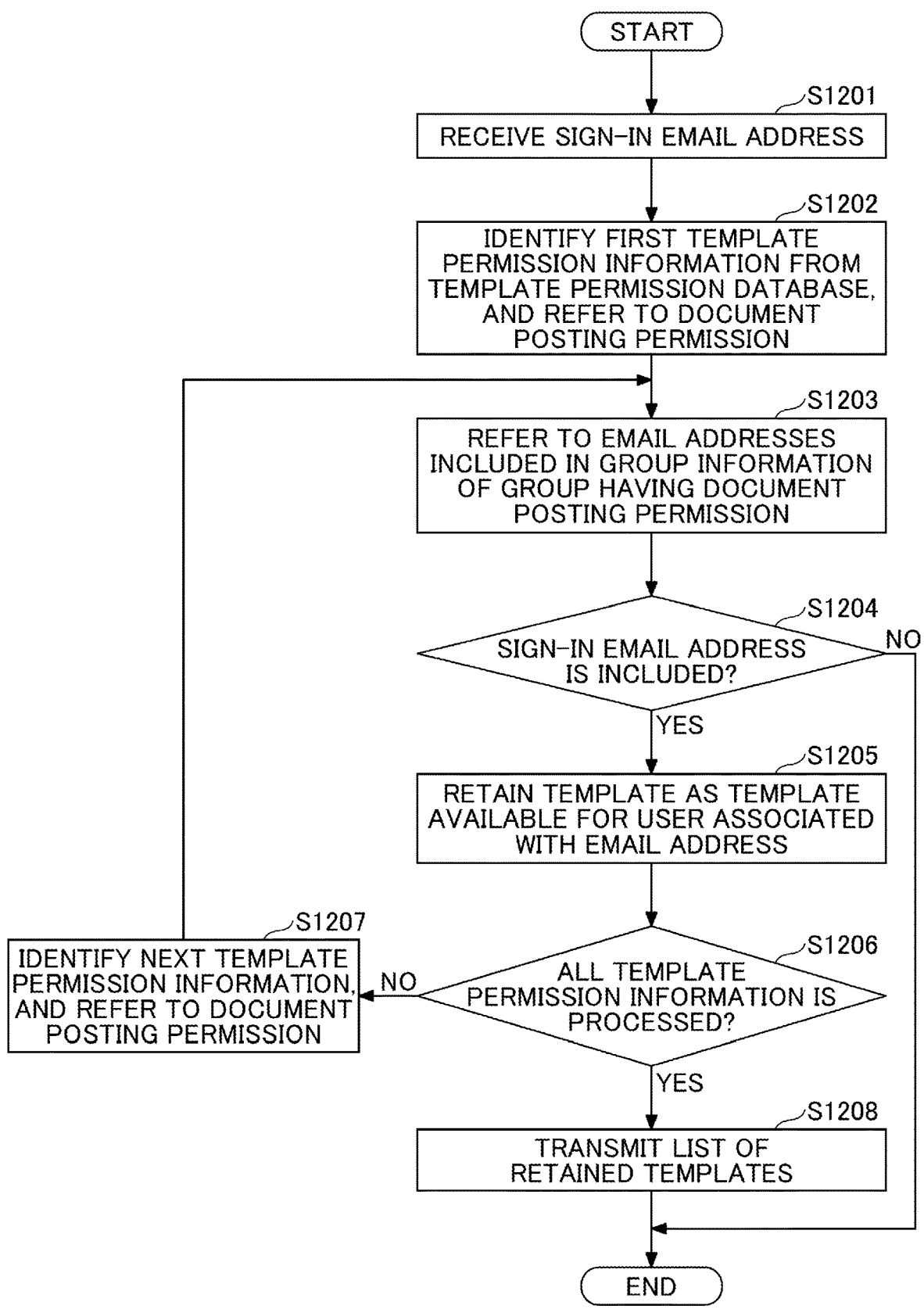
FIG. 12 is a flowchart illustrating a process performed by the information processing apparatus.

Next, a process performed by the list identifying unit 245 in step S1106 of FIG. 11 will be described with reference to FIG. 12. FIG. 12 is a flowchart illustrating a process performed by the information processing apparatus.

In the information processing apparatus 200 according to the present embodiment, the list identifying unit 245 receives a sign-in email address (step S1201). Next, the list identifying unit 245 of the information processing apparatus 200 identifies first template permission information from the template permission database 210, and refers to a value of the item "document posting permission" included in the first template permission information (step S1202).

In other words, the list identifying unit 245 refers to a group that has been granted document posting permission for a template identified by the first template ID.

Next, the list identifying unit 245 refers to the group database 230, and refers to email addresses included in group information of the group that has been granted the document posting permission (step S1203).

Next, the list identifying unit 245 determines whether the sign-in email address is included in the email addresses, which are included in the group information of the group that has been granted the document posting permission (step S1204).

In step S1204, if the sign-in email address is not included, the list identifying unit 245 determines that no template is available for the user and ends the process.

In step S1204, if the sign-in email address is included, the list identifying unit 245 retains the template ID included in the first template permission information, as a template available for the user (step S1205).

Next, the list identifying unit 245 determines whether all template permission information stored in the template permission database 210 is processed (step S1206). If the list identifying unit 245 determines that all template permission information is not processed in step S1206, the list identifying unit 245 identifies the next template permission information and refers to a value of the item "document posting permission" (step S1207). Then, the list identifying unit 245 returns to step S1203.

If the list identifying unit 245 determines that all template permission information is processed in step S1206, the list identifying unit 245 transmits a list of templates associated with retained template IDs to the user terminal 400 (step S1208), and ends the process.

In the example of FIG. 12, the process performed by the list identifying unit 245 when the information processing apparatus 200 receives a request to obtain a list of templates from the user terminal 400 has been described. However, a process similar to the above-described process is performed when the information processing apparatus 200 receives a request to obtain a list of templates from the administrator terminal 300.

In this case, the list identifying unit 245 may identify template permission information, refer to a value of the item "template administrative permission", and determine whether a sign-in email address is included in a group that has been granted template administrative permission. The other steps are the same as those of FIG. 12.

Figure 13A:
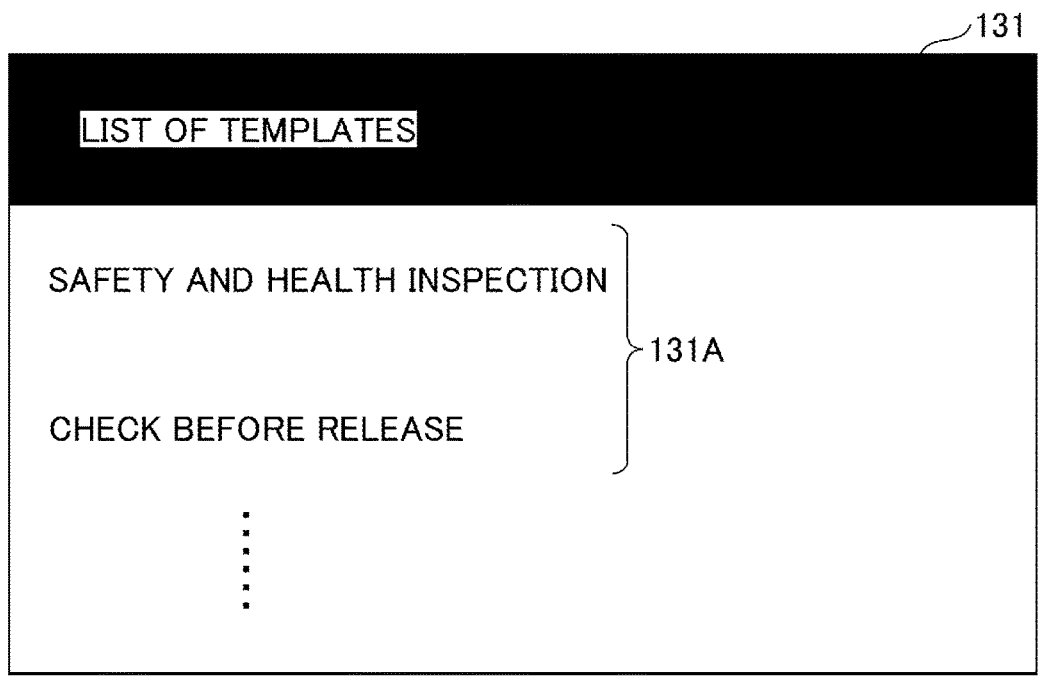
FIG. 13A and FIG. 13B are first diagrams illustrating examples of display screens of a terminal apparatus (user terminal)
Figure 13B:
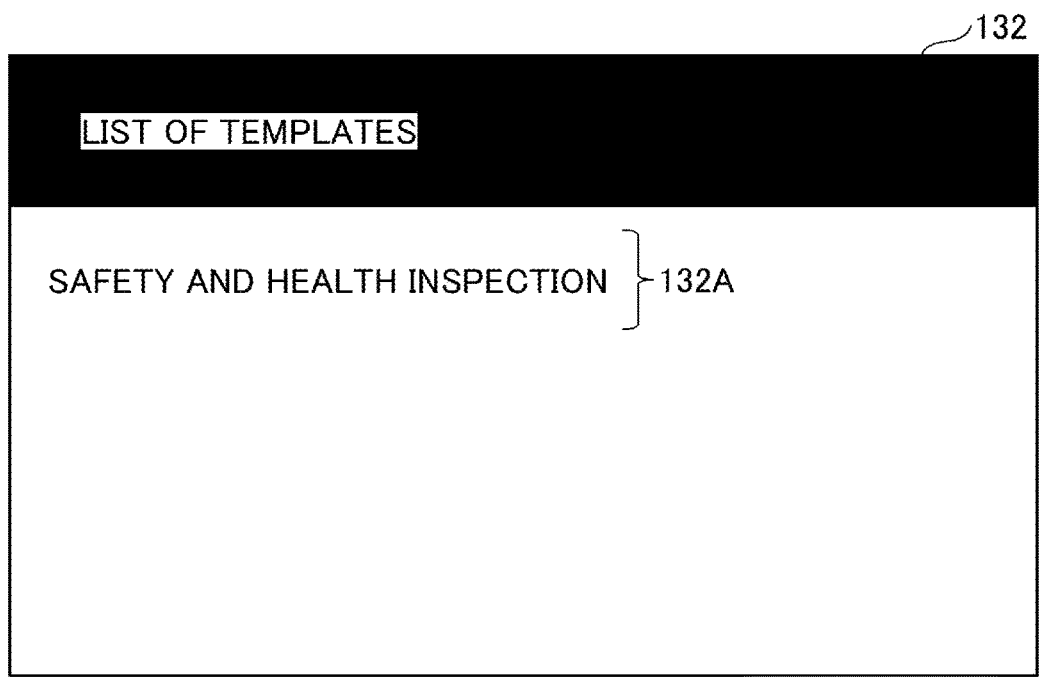

In the following, examples of display screens of the user terminal 400 will be described with reference to FIG. 13A and FIG. 13B. FIG. 13A and FIG. 13B are first diagrams illustrating examples of display screens of the terminal apparatus (user terminal).

Each of a screen 131 illustrated in FIG. 13A and a screen 132 illustrated in FIG. 13B depicts a state in which a list of templates is displayed on the user terminal 400.

The screen 131 illustrated in FIG. 13A displays the names of a plurality of templates as a templates list 131A. In this case, it can be seen that the user of the user terminal 400 belongs to a group that has been granted document posting permission for the plurality of templates.

The user can use the templates included in the list 131A to create task report data.

The screen 132 illustrated in FIG. 13B displays the name of a single template as a templates list 132A. In this case, it can be seen that the user of the user terminal 400 belongs to a group that has been granted document posting permission for the single template.

The user can use the template included in the list 132A to create task report data.

Next, the operation of the information processing system 100 when the user of the user terminal 400 views or edits task report data will be described with reference to FIG. 14. FIG. 14 is a fourth sequence diagram illustrating the operation of the information processing system.

Steps S1401 through step S1404 of FIG. 14 are similar to step S1101 through step S1104 of FIG. 11, and thus the description thereof will not be repeated.

When receiving an operation for obtaining templates, the user terminal 400 transmits a request to obtain a list of templates to the information processing apparatus 200 and the like (step S1405).

When the list identifying unit 245 of the information processing apparatus 200 receives the request to obtain a list of templates, the list identifying unit 245 identifies a list of templates for which the user who performed the operation for obtaining templates has document viewing permission or document editing permission (step S1406).

Next, the communication unit 247 of the information processing apparatus 200 transmits the identified list of templates to the user terminal 400, and causes the user terminal 400 to display the list of templates (step S1407).

When the user terminal 400 receives an operation for selecting a template, the user terminal 400 transmits a request to obtain a list of task report data that uses the selected template to the information processing apparatus 200 (step S1408). The request to obtain a list of task report data includes a template ID associated with the selected template and a sign-in email address.

When the information processing apparatus 200 receives the request to obtain a list of task report data, the identifying unit 245 of the information processing apparatus 200 obtains permissions that are assigned to a group including the sign-in email address, for the selected template (step S1409). In other words, the list identifying unit 245 identifies the types of permissions assigned to the signed-in user for task report data that uses the selected template.

Next, the list identifying unit 245 refers to the document database 220, and obtains a list of task report data that uses the selected template (step S1410). Specifically, the list identifying unit 245 refers to the document database 220, and obtains a list of task report data associated with the selected template ID.

Next, the information processing apparatus 200 transmits the obtained list of task report data to the user terminal 400, and causes the user terminal 400 to display the list of task report data (step S1411). At this time, the display format of a task report data list screen differs depending on permission type(s) assigned to the signed-in user. Details of the task report data list screen will be described later.

When receiving an operation for selecting task report data to be viewed on the task report data list screen, the user terminal 400 sends a request to view the selected task report data to the information processing apparatus 200 (step S1412). The information processing apparatus 200 causes the user terminal 400 to display the selected task report data stored in the information processing apparatus 200.

If the signed-in user has document editing permission for the selected template, the user terminal 400 receives an operation for selecting task report data to be edited on the task report data list screen. Then, the user terminal 400 transmits a request to edit the selected task report data to the information processing apparatus 200 (step S1413).

The information processing apparatus 200 causes the user terminal 400 to display the selected task report data. In response to the task report data being edited, the update unit 246 updates the document database 220 (step S1414).

Specifically, the update unit 246 stores the edited task report data in the document database 220. At this time, the update unit 246 may overwrite existing task report data with the edited task report data, or may store the edited task report data separately from existing task report data.

Next, examples of the task report data list screen of the user terminal 400 will be described with reference to FIG. 15 and FIG. 16.

FIG. 15 is a second diagram illustrating an example of a display screen of the terminal apparatus (user terminal). A screen 151 illustrated in FIG. 15 is an example of the task report data list screen when a signed-in user has document viewing permission and document editing permission for a selected template.

The screen 151 includes a display field 152 and a display field 153. The display field 152 displays the name of the selected template.

A list of task report data, created by using the template displayed in the display field 152, is displayed in the display field 153.

In the example of FIG. 15, operation members for editing respective pieces of task report data are displayed in a display area 154 of the display field 153. The operation members are associated with the respective pieces of task report data.

In response to an operation member displayed in the display area 154 being selected on the screen 151, the user terminal 400 transmits a request to edit task report data, associated with the selected operation member, to the information processing apparatus 200.

FIG. 16 is a third diagram illustrating an example of a display screen of the terminal apparatus (user terminal). A screen 151A illustrated in FIG. 16 is an example of the task report data list screen when a signed-in user has document viewing permission for a selected template, but does not have document editing permission.

On the screen 151A, a list of task report data is displayed in a display field 153A. Further, the display area 154 of the display field 153A does not display any operation member for transmitting a request to edit task report data to the information processing apparatus 200.

Accordingly, in the present embodiment, the display format of the screen displayed on the user terminal 400 can differ depending on the permission(s) assigned to the user when the template is created.

Accordingly, in the present embodiment, when predetermined data is created, the administrator terminal 300 displays a screen that includes a creation field in which the predetermined data is created and a setting field in which permissions for the predetermined data are individually set for each user. In the present embodiment, creating the predetermined data and assigning permissions to users for the predetermined data can be performed on the same screen at the same time. Therefore, the burden on the administrator in assigning permissions to users can be reduced.

The functions of the embodiments described above may be implemented by one or more processing circuits. As used herein, the "processing circuit" includes a processor programmed to cause software to execute the functions, such as a processor implemented by electronic circuitry, and an application-specific integrated circuit (ASIC), a digital signal processor (DSP), a field-programmable gate array (FPGA), and a conventional circuit module designed to execute the above-described functions.

Further, a group of apparatuses described in the embodiments is merely one group of apparatuses in a plurality of computing environments.

In a specific embodiment, the information processing apparatus 200 includes a plurality of computing devices such as server clusters. The plurality of computing devices are configured to communicate with each other via a commutation link such as a network or a shared memory, and perform the processes described herein. Similarly, the information processing apparatus 200 can include a plurality of computing devices that are configured to communicate with each other.

Further, the information processing apparatus 200 may be configured to share various combinations of the steps described herein. For example, a process performed by the information processing apparatus 200 may be performed by another information processing apparatus. Similarly, the functions of the information processing apparatus 200 may be implemented by another information processing apparatus. Further, the constituent elements of the information processing apparatus 200 may be integrated into one information processing apparatus or may be distributed over several information processing apparatuses.

The tables in the above-described embodiments may be generated by the learning effect of machine learning. Further, the tables are not required to be used by classifying data of each related item by machine leaning.

As used herein, machine learning is a technique for causing a computer to acquire a learning ability like a person, in which a computer autonomously generates an algorithm necessary for determining the data identification and the like from previously acquired learning data, and applies the algorithm to new data to make predictions. The learning method for machine learning may be supervised learning, unsupervised learning, semi-supervised learning, reinforcement learning, or deep learning, or a combination of these learning methods, and the learning method for machine learning is not particularly limited.

Although the present invention has been described based on the embodiments, the present invention is not limited to the above-described embodiments. The embodiments may be modified without departing from the scope of the present invention and may be appropriately defined according to the application forms.

What is claimed is:

1. An information processing apparatus comprising:
a first memory; and
a processor coupled to the first memory and configured to
store a template in the first memory in response to the template being created in which first identification information for identifying a request task is associated with a first input item, and second identification information for identifying a report task, for the request task, is associated with a second input item, the first identification information being input in a first input field, the first input item being selected in a first selection field such that first input information corresponding to the first input item is to be input, the second information being input in a second input field, and the second input item being selected in a second selection field such that second input information corresponding to the second input item is to be input;
receive an input of the first input information in a case where the created template is used in performing the request task; and
receive an input of the second input information in a case where the created template is used in performing the report task,
wherein in response to receiving a request to create the template, the processor outputs screen data for displaying, on a display device, a screen including a creation field and a setting field in which a permission is set for the template on a per user basis, wherein the permission is one or more of template management permission, template use permission, document data viewing permission, and document data editing permission.

2. The information processing apparatus according to claim 1, wherein the creation field includes the first input field in which the first identification information for identifying the request task is input, the first selection field in which the first input item is selected such that the first input information corresponding to the first input item associated with the request task is to be input, the second input field in which the second identification information for identifying the report task, for the request task, is input, and the second selection field in which the second input item is selected such that the second input information corresponding to the second input item associated with the report task is to be input.

3. The information processing apparatus according to claim 1, wherein the template use permission indicates that a user is permitted to create document data from the template.

4. The information processing apparatus according to claim 3, wherein the permission is also set on a per user group basis in the setting field, the user group being defined by grouping users.

5. The information processing apparatus according to claim 3, wherein the processor stores permission information in the first memory, the permission information including content input in the creation field in association with the permission set on the per-user basis in the setting field.

6. The information processing apparatus according to claim 5, wherein, in response to receiving user information of a user and a request to obtain a list of templates, the processor refers to the first memory, identifies the list of templates for which the user of the user information has a permission, and outputs screen data for displaying the list of templates on the display device.

7. The information processing apparatus according to claim 6, further comprising a second memory,
wherein, in response to receiving a request to create document data, the processor
refers to the first memory,
identifies a list of templates for which the user of the user information has the template use permission,
causes the display device to display the list of templates from which a given template is selected, the given template being used to create the document data, and
stores the document data in the second memory.

8. A non-transitory recording medium storing a program for causing a computer to execute a process comprising:
storing a template in a memory in response to the template being created in which first identification information for identifying a request task is associated with a first input item, and second identification information for identifying a report task, for the request task, is associated with a second input item, the first identification information being input in a first input field, the first input item being selected in a first selection field such that first input information corresponding to the first input item is to be input, the second information being input in a second input field, and the second input item being selected in a second selection field such that second input information corresponding to the second input item is to be input;
receiving an input of the first input information in a case where the created template is used in performing the request task;
and receiving an input of the second input information in a case where the created template is used in performing the report task,
wherein the process further comprising, in response to receiving a request to create the template, outputting screen data for displaying, on a display device, a screen including a creation field and a setting field in which a permission is set for the template on a per user basis, wherein the permission is one or more of template management permission, template use permission, document data viewing permission, and document data editing permission.

9. An information processing system comprising:
an information processing apparatus; and
a terminal apparatus,
wherein the information processing apparatus includes a first memory, and a first processor coupled to the first memory and configured to
store a template in the first memory in response to the template being created in which first identification information for identifying a request task is associated with a first input item, and second identification information for identifying a report task, for the request task, is associated with a second input item, the first identification information being input in a first input field, the first input item being selected in a first selection field such that first input information corresponding to the first input item is to be input, the second information being input in a second input field, and the second input item being selected in a second selection field such that second input information corresponding to the second input item is to be input,
receive an input of the first input information in a case where the created template is used in performing the request task, and
receive an input of the second input information in a case where the created template is used in performing the report task,
wherein the terminal apparatus includes a second memory, and a second processor coupled to the second memory, the second processor being configured to
transmit, to the information processing apparatus, the first input information in a case where the created template is used in performing the request task, and
transmit, to the information processing apparatus, the second input information in a case where the created template is used in performing the report task, and
wherein in response to receiving a request to create the template, the second processor outputs screen data for displaying, on a display device, a screen including a creation field and a setting field in which a permission is set for the template on a per user basis, wherein the permission is one or more of template management permission, template use permission, document data viewing permission, and document data editing permission.

* * * * *